(12) United States Patent
Dhawan et al.

(10) Patent No.: US 10,171,288 B2
(45) Date of Patent: Jan. 1, 2019

(54) DIAGNOSING FAULTS IN STATELESS DISTRIBUTED COMPUTING PLATFORMS

(71) Applicant: International Business Machines Corporation, Armonk, NY (US)

(72) Inventors: Mohan Dhawan, Bangalore (IN); Kshiteej Mahajan, Bangalore (IN); Vijay Mann, Bangalore (IN); Rishabh Poddar, Bangalore (IN); Dhruv Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/974,457

(22) Filed: Dec. 18, 2015

(65) Prior Publication Data

US 2017/0180509 A1 Jun. 22, 2017

(51) Int. Cl.
*H04L 12/24* (2006.01)
*H04L 29/08* (2006.01)
*H04L 29/06* (2006.01)
*H04L 29/14* (2006.01)

(52) U.S. Cl.
CPC .......... *H04L 41/0631* (2013.01); *H04L 67/02* (2013.01); *H04L 67/40* (2013.01); *H04L 69/40* (2013.01)

(58) Field of Classification Search
CPC ..... H04L 67/327; H04L 67/10; H04L 43/0811
See application file for complete search history.

(56) References Cited

U.S. PATENT DOCUMENTS

| 6,691,165 B1 * | 2/2004 | Bruck | H04L 29/12009 709/227 |
| 9,003,031 B2 * | 4/2015 | Chatterjee | H04L 43/04 709/223 |
| 9,450,823 B2 * | 9/2016 | Arora | H04L 41/082 |

(Continued)

OTHER PUBLICATIONS

Ghasemi et al., RINC: Real-Time Inference-based Network Diagnosis in the Cloud. CoNext Student Workshop'13, Dec. 9, 2013.

(Continued)

*Primary Examiner* — Uzma Alam
(74) *Attorney, Agent, or Firm* — Ryan, Mason & Lewis, LLP

(57) ABSTRACT

Methods, systems, and computer program products for diagnosing faults in stateless distributed computing platforms are provided herein. A computer-implemented method includes processing a plurality of communication messages exchanged between two or more distributed components within a stateless distributed system; determining a message context for each of the plurality of communication messages based on one or more message identifiers extracted from each of the plurality of communication messages; grouping the plurality of communication messages into multiple clusters pertaining to message invocation, wherein said grouping is based on the determined message context for each of the plurality of communication messages; generating a control flow graph by creating one or more connections across the multiple clusters; and detecting a causal chain of events associated with a detected fault in the stateless distributed system by navigating the control flow graph.

17 Claims, 4 Drawing Sheets

(56) References Cited

U.S. PATENT DOCUMENTS

| | | | | |
|---|---|---|---|---|
| 9,645,811 | B2* | 5/2017 | Carlen | H04L 65/80 |
| 2005/0273675 | A1* | 12/2005 | Rao | G06F 9/542 |
| | | | | 714/100 |
| 2009/0100289 | A1* | 4/2009 | Chen | G06F 11/203 |
| | | | | 714/4.11 |
| 2013/0219022 | A1* | 8/2013 | Manivel | G06F 9/5011 |
| | | | | 709/219 |
| 2014/0215256 | A1* | 7/2014 | Malisetti | G06F 11/0793 |
| | | | | 714/2 |
| 2014/0280894 | A1* | 9/2014 | Reynolds | H04L 43/0876 |
| | | | | 709/224 |
| 2014/0298091 | A1* | 10/2014 | Carlen | H04L 65/80 |
| | | | | 714/15 |
| 2014/0351666 | A1* | 11/2014 | Kim | H04L 1/1685 |
| | | | | 714/748 |
| 2015/0237119 | A1 | 8/2015 | Bansal et al. | |
| 2015/0355961 | A1* | 12/2015 | Lesartre | G06F 11/0793 |
| | | | | 714/57 |
| 2016/0073278 | A1* | 3/2016 | Roessler | H04L 49/70 |
| | | | | 370/252 |

OTHER PUBLICATIONS

Bahl et al. Towards Highly Reliable Enterprise Network Services via Inference of Multi-level Dependencies. In SIGCOMM'07.
Barham et al. Using Magpie for Request Extraction and Workload Modelling. In OSDI'04.
Bitincka et al. Optimizing Data Analysis with a Semi-structured Time Series Database. In SLAML'10.
Chanda et al. Whodunit: Transactional Profiling for Multi-tier Applications. In SOSP'07.
Chen et al. Pinpoint: Problem Determination in Large, Dynamic Internet Services. In DSN'02.
Chen et al. Path-based Failure and Evolution Management. In NSDI'04.
Fonseca et al. Experiences with Tracing Causality in Networked Services. In INM/WREN'10.
Fonseca et al. X-trace: A Pervasive Network Tracing Framework. In NSDI'07.
Gschwind et al. Webmon: A Performance Profiler for Web Transactions. In WECWIS'02.
Guerraoui et al. Model Checking a Networked System Without the Network. In NSDI'11.
Gunawi et al. What Bugs Live in the Cloud?: A Study of 3000+ Issues in Cloud Systems. In SOCC'14.
Guo et al. Practical Software Model Checking via Dynamic Interface Reduction. In SOSP'11.
Hellerstein et al., ETE: A Customizable Approach to Measuring End-to-end Response Times and their Components in Distributed Systems. In ICDCS'99.
Ju et al. On Fault Resilience of OpenStack. In SOCC'13.
Kandula et al. Detailed Diagnosis in Enterprise Networks. In SIGCOMM'09.
Kavulya et al. Draco: Statistical Diagnosis of Chronic Problems in Distributed Systems. In DSN'12.
Leesatapornwongsa et al. SAMC: Semantic-aware Model Checking for Fast Discovery of Deep Bugs in Cloud Systems. In OSDI'14.
Lin et al. Modist: Transparent Model Checking of Unmodified Distributed Systems. In NSDI'09.
Nguyen et al. FChain: Toward Black-box Online Fault Localization for Cloud Systems. In ICDCS'13.
Paxson. Bro: A System for Detecting Network Intruders in Real-time. In USENIX Security'98.
Reynolds et al. Pip: Detecting the Unexpected in Distributed Systems. In NSDI'06.
Sambasivan et al. Diagnosing Performance Changes by Comparing Request Flows. In NSDI'11.
Sigelman et al. Dapper: A Large-scale Distributed Systems Tracing Infrastructure. Google Research, 2010.
Simsa et al. dBug: Systematic Evaluation of Distributed Systems. In SSV'10.
Tak et al. vPath: Precise Discovery of Request Processing Paths from Black-Box Observations of Thread and Network Activities. In ATC'09.
Tan et al. Visual, Log-based Causal Tracing for Performance Debugging of MapReduce Systems. In ICDCS'10.
Thereska et al. Stardust: Tracking Activity in a Distributed Storage System. In SIGMETRICS'06.
Xu et al. Detecting Large-scale System Problems by Mining Console Logs. In SOSP'09.
Yabandeh et al. CrystalBall: Predicting and Preventing Inconsistencies in Deployed Distributed Systems. In NSDI'09.
Yuan et al. SherLog: Error Diagnosis by Connecting Clues from Run-time Logs. In ASPLOS'10.
Zaharia et al. Discretized Streams: Fault-tolerant Streaming Computation at Scale. In SOSP'13.

* cited by examiner

## DIAGNOSING FAULTS IN STATELESS DISTRIBUTED COMPUTING PLATFORMS

FIELD

The present application generally relates to information technology, and, more particularly, to cloud computing technologies.

BACKGROUND

Cloud stacks provide access to resources via a series of tasks, and such tasks generally require coordination among multiple distributed processes. Complexity and non-determinism in task executions, however, can result in problems that are difficult to diagnose, including operational performance and/or latency issues.

SUMMARY

In one embodiment of the present invention, techniques for diagnosing faults in stateless distributed computing platforms are provided. An exemplary computer-implemented method can include steps of processing a plurality of communication messages exchanged between two or more distributed components within a stateless distributed system, and determining a message context for each of the plurality of communication messages based on one or more message identifiers extracted from each of the plurality of communication messages. The exemplary method can also include grouping the plurality of communication messages into multiple clusters pertaining to message invocation, wherein such grouping is based on the determined message context for each of the plurality of communication messages, and generating a control flow graph by creating one or more connections across the multiple clusters. Further, the exemplary method can include detecting a causal chain of events associated with a detected fault in the stateless distributed system by navigating the control flow graph.

In another embodiment of the invention, another exemplary computer-implemented method can include steps of implementing a monitoring agent at each of multiple nodes in a stateless distributed system to monitor all communication messages exchanged between the multiple nodes, and determining a message context for each of the monitored communication messages based on one or more message identifiers extracted from each of the monitored communication messages. This exemplary method can also include grouping the monitored communication messages into multiple clusters pertaining to message invocation, wherein such grouping is based on the determined message context for each of the monitored communication messages. Additionally, this exemplary method can include generating a control flow graph by (i) creating a temporal order of the monitored communication messages in each of the multiple clusters, and (ii) creating one or more connections across the multiple clusters, as well as detecting a causal chain of events associated with a detected fault in the stateless distributed system by navigating the control flow graph.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps.

Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
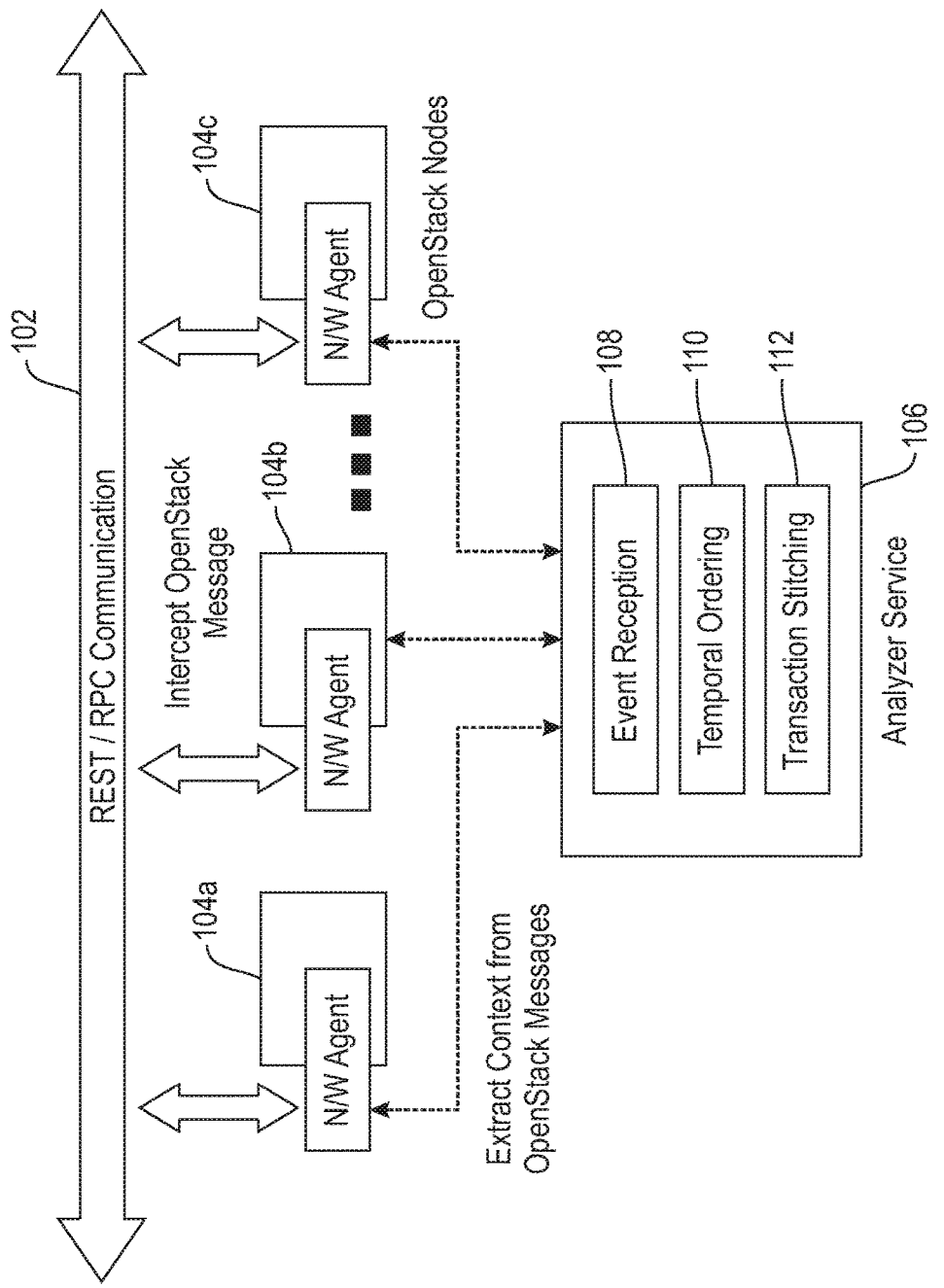
FIG. 1 is a diagram illustrating system architecture, according to an exemplary embodiment of the invention.

As described herein, an embodiment of the present invention includes diagnosing faults in stateless cloud computing platforms. At least one embodiment of the invention is described herein in connection with OpenStack®, but it should be noted that OpenStack® is merely one example and that one or more other cloud computing platforms can be utilized. Also, one or more embodiments of the invention, as detailed herein, can be implemented within the context of stateless distributed systems. Such embodiments of the invention can include characteristics such as, for example, all state changes happening through communication messages, all resources having unique identifiers, and all such communication messages including those resource identifiers.

Accordingly, at least one embodiment of the invention includes implementing network monitoring agents at each node in a distributed system to capture and relay OpenStack® representational state transfer (REST) and remote procedure call (RPC) messages to a centralized analyzer service. In connection with such an embodiment, it is noted that distributed systems commonly use unique identifiers in communication messages for identifying resources across components. As such, the above-noted analyzer service uses this property of distributed systems to systematically combine both REST and RPC messages across different distributed system components, while being agnostic of the application programming interface (API) behavior and the message protocol.

At least one embodiment of the invention includes searching each OpenStack® message for unique identifiers, such as 32-character hexadecimal universally unique identifiers (UUIDs), Internet protocol (IP) addresses, source ports and destination ports, to create a message context. Such an embodiment can subsequently include stitching together multiple contexts to update temporal states observed at each component in the communication, and generating a control flow graph corresponding to operator actions. Such modeling of the temporal state, along with one or more other heuristics, facilitates pruning of the control flow graph and increasing precision. On detection of an error, such an embodiment can include backtracking from the faulty node in the graph to identify a causal chain of events.

As further detailed herein, one or more embodiments of the invention include diagnosing faults in a distributed system by constructing a transaction flow based on communication messages exchanged between distributed components. Such an embodiment can include processing communication messages (REST and/or RPC messages) across the distributed system via monitoring agents and determining message context based on message identifiers and message latency. Further, such an embodiment can include utilizing the message context to determine and/or organize clusters of related message invocations for creating causal linkages across message invocations to detect classes of faults reflected in network messages as errors and exceptions.

As also described herein, a challenge in network monitoring for root cause analysis in distributed systems (such as OpenStack®, for example), includes determining the correct sequence of REST and RPC calls for every relevant task by the developer and/or operator which leads to a fault. As such, one or more embodiments of the invention include determining the correct transitions in an event sequence (ES) that drive a system from a given state to an error state.

Accordingly, a transaction in OpenStack® is modeled as an ES, and each REST and RPC message is modeled as a transition that drives the system to a new state. Further, in OpenStack®, RPCs update the system state for the same component, while RESTs potentially update states across components. Directives issued from the dashboard or a command-line interface (CLI) (that is, REST calls that initiate new administrative tasks (or "transactions")) create new start states in the ES, corresponding to different transactions. All other REST and/or RPC messages result in intermediate states. An error state is a state wherein the REST and/or RPC transitions report an error.

A transaction is thus a sequence of temporally related REST and/or RPC transitions between states. In particular, (a) REST requests issued to components create new states in the ES for those components, and (b) RPCs and REST responses create updated states of components in the ES. Thus, REST requests signify transitions from one component to another, while RPCs update the state of existing components. REST responses update the state of the component initiating the REST request. As an example, consider an ES for a transaction involving a REST request from component A to component B, followed by an RPC at component B, which updates its state to B'. The REST response from B' updates the state of A to A'.

As noted above, OpenStack®, by way of example, makes use of unique identifiers to describe and locate resources in a system, and the different system nodes maintain internal states corresponding to each of these identifiers. Accordingly, at least one embodiment of the invention includes analyzing network messages flowing across different components to analyze and leverage the unique identifiers to construct an execution trail of events. Upon detection of a fault, such an embodiment can include backtracking the execution graph to string together the exact sequence of events that possibly lead to the fault.

FIG. 1 is a diagram illustrating system architecture, according to an embodiment of the invention. By way of illustration, FIG. 1 depicts a distributed setup of network (N/W) monitoring agents 104a, 104b and 104c (herein, collectively referred to as "network monitoring agents 104"), and a central analyzer service 106. As depicted in FIG. 1, the network monitoring agents 104 intercept and/or process OpenStack® messages from a REST and/or RPC communication 102. As also depicted in FIG. 1, the (central) analyzer service 106 extracts context from the intercepted and/or processed messages. Further, the analyzer service 106, as additionally detailed herein, includes an event reception component 108, a temporal ordering component 110, and a transaction stitching component 112.

Accordingly, at least one embodiment of the invention (such as depicted in FIG. 1) includes executing transparently underneath an existing deployment without affecting the safety and/or liveness of the distributed system. Such an embodiment includes supporting precise fault detection via (i) distributed network monitoring and context extraction, (ii) execution graph construction, and (iii) fault diagnosis.

The network monitoring agents 104 are positioned at each node in an existing OpenStack® deployment because the network monitoring agents 104 monitor all OpenStack® messages sent amongst such nodes. The network monitoring agents 104 search and/or analyze each network message for unique identifiers, and further use these identifiers to create a message context, which is communicated to the central analyzer service 106 along with additional metadata regarding the OpenStack® message (including, for example, the source and/or destination, protocol (that is, REST or RPC), and the OpenStack® message body). Analyzing unique identifiers at the network agents expedites computation of the execution graph at the central analyzer service 106.

As such, the analyzer service 106 extracts the message contexts communicated by the network monitoring agents 104 to construct an execution graph of network events, which is a representation of the event sequence model described herein. The creation of the execution graph also includes (a) temporal ordering of messages (containing contexts) received from the network monitoring agents 104, and (b) stitching together related message contexts into a logical transaction.

In one or more embodiments of the invention, the analyzer service 106 can be implemented as a multi-threaded application with the above-noted components (the event reception component 108, the temporal ordering component 110, and the transaction stitching component 112). Each of these components can execute as a separate thread and interact with the others using shared memory and exposed APIs. Responsibilities of event reception component 108 include reception of events from the distributed network monitoring agents 104 via one or more connections. The event reception component 108 writes the received events to a buffer shared with the temporal ordering component 110, which employs a binary search to place these possibly out-of-order events into time buckets to ensure temporal ordering. The temporal ordering component 110 maintains a local timer to periodically purge any expired time buckets from the active pipeline, and makes them available for the transaction stitching component 112. The transaction stitching component 112 processes the events in these expired buckets to construct an execution graph.

Additionally, one or more embodiments of the invention include employing one or more optimizations to improve performance of the analyzer service 106. For example, such an embodiment can include implementing the shared buffer (co-owned by the event reception component 108 and the temporal ordering component 110) as a circular buffer to minimize contention between the two threads, and avoid any loss of events during the wait. Additionally, such an embodiment can include deferring actions such as sorting of events within t-buckets, error detection, etc., until t-bucket timer expiry is triggered and the bucket is waiting to be consumed, thereby reducing processing delays in the active pipeline.

As indirectly noted above, messages from the network monitoring agents 104 can arrive out of order. Accordingly, one or more embodiments of the invention includes ensuring that such out-of-order messages can be temporally ordered by leveraging a continuous stream (or pipeline) of "time buckets" (also referred to herein as "t-buckets"), each such bucket having a start timestamp and an end timestamp. Only messages that have timestamps falling within the time-bounds of a t-bucket can be added to that t-bucket. Messages within each t-bucket are further ordered using a sorting mechanism. By way of example, sorting can be performed using any mechanism that arranges items within the buckets in an increasing time sequence.

Each t-bucket remains active for a stipulated period of time, during which new messages can be added thereto. This ensures that even the messages that have timestamps belonging to the given t-bucket, but have been received late due to network and/or buffer delays, can still be processed in a sorted order. The expiry of each t-bucket can be marked, for example, by the expiry of an associated timer. In such an embodiment of the invention, messages that are time-stamped later than the newest bucket lazily generate a new t-bucket. Messages marked earlier than the oldest active t-bucket in the pipeline are discarded. The granularity of the timer and the t-bucket window length can be system-dependent and can be based, for example, on the traffic observed at the analyzer service 106.

Determining a complete transaction sequence in an execution graph entails finding the correct transitions in the event sequence. The number of RPCs in a typical OpenStack® deployment can commonly outnumber the REST calls. Note that a response header of a REST call that initiated related RPCs can contain the OpenStack® request identifier (ID) shared across the RPCs. Also, because a REST request-response pair can be identified from the message metadata, at least one embodiment of the invention can also include determining the parent REST request that resulted in the ensuing RPCs. Therefore, such an embodiment can include collapsing all consecutive RPC transitions with the same request ID into the state created by the parent REST request, thereby significantly reducing the states in the execution graph. The states in the graph can, accordingly, be linked by REST transitions only, while RPC transitions can be represented by self edges.

At least one embodiment of the invention includes processing messages from t-buckets as follows. A REST request to a particular component (for example, from component A to component B in the above example) results in the creation of a new state in the execution graph for that component (component B in this example), initialized with the context extracted from the incoming REST request. Ensuing RPCs augment the state thus created with their own contexts. Transaction stitching, therefore, includes identifying an already existing state in the execution graph that initiated the REST request (that is, the identification of state/component A in the above example).

At least one embodiment of the invention, by way of example, can include identifying state A as follows. A REST request to component B could have originated from a state A only if the context in the REST request is a subset of the contexts available at state A. Further, state/component A acquires its contexts either from an incoming REST request, or computes its contexts using the ensuing RPCs, or both.

Thus, for a REST transition from state A to state B, the following must hold true: A→B: $\mathbb{C}(A_{RESTreq}) \cup \mathbb{C}(A_{RPC}) \supseteq \mathbb{C}(B_{RESTreq})$, wherein $\mathbb{C}(X)$ represents the set of contexts extracted in X. $\mathbb{C}(X)$ is the message context corresponding to packet X. For example, $\mathbb{C}(A_{RESTreq})$ is the context extracted from the packet for the REST request incident on node A. Subsequently, at least one embodiment of the invention can include creating a copy A' of state A and augmenting the copy A' with unique context received in the REST response from state B as follows: $\mathbb{C}(A')=\mathbb{C}(A) \cup \mathbb{C}(B_{RESTresp})$. All further transition placements from state A are to account for this state update and at least one embodiment of the invention can include placing subsequent transitions starting from state A' instead of state A, thereby maintaining a causal sequence of transitions.

Figure 2:
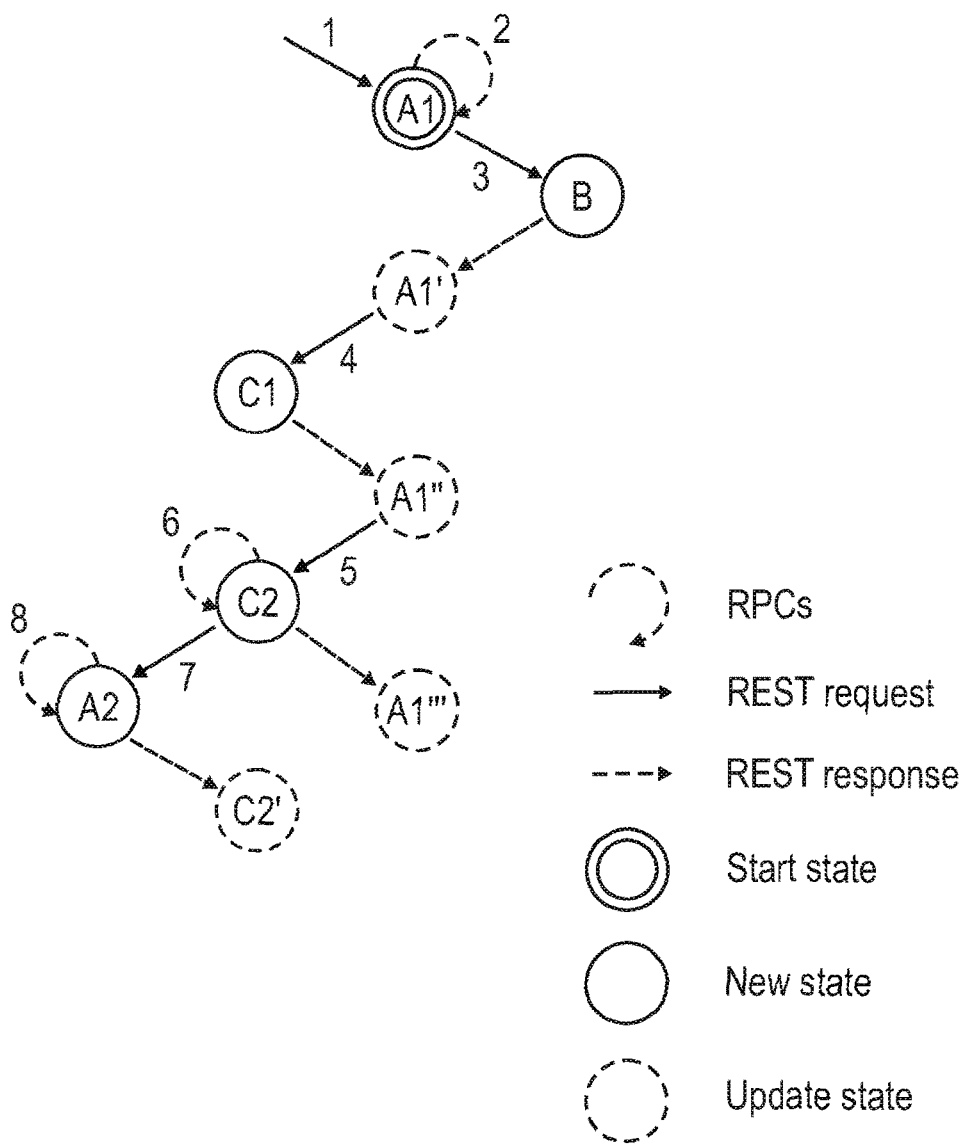
FIG. 2 is a diagram illustrating an execution graph for launching a new instance, according to an exemplary embodiment of the invention.

FIG. 2 is a diagram illustrating an execution graph 202 for launching a new instance, according to an exemplary embodiment of the invention. By way of illustration, FIG. 2 depicts processing a REST request in step 1 to create a new start state in the execution graph (A1). Ensuing RPCs update A1 with their contexts. The subsequent GET request in step 3 creates a new state B. Accordingly, the exemplary embodiment of the invention depicted in FIG. 2 includes stitching the new state B to A1 and creating an updated state A1' for A1 using the REST response from state B. The process continues similarly, resulting in the construction of the graph 202 as shown in FIG. 2. Note that the REST in step 5 creates a new state C2, and does not update C1.

Also, as a message context is consumed from t-buckets to update an execution graph, at least one embodiment of the invention can include scanning the OpenStack® message body (available from the context) to detect the presence of faults. In RESTs, errors can be indicated in the hypertext transfer protocol (HTTP) response header. For RPCs, diagnosing faulty messages can include implementing domain-specific knowledge of OpenStack® so that error patterns are accurately identified in the message body. To ensure this operation remains lightweight, at least one embodiment of the invention can include not parsing the JavaScript™ object notation (JSON) formatted message body; rather, such an embodiment can include using regular expressions to identify error codes in the message, if any. Once a fault is identified, an example embodiment of the invention includes backtracking from the faulty state in the execution graph to the start state, determining the sequence of events that led to the fault in the transaction.

Additionally, one or more embodiments of the invention include implementing one or more heuristics that enable pruning of undesirable transitions between states. For example, an HTTP/1.1 protocol contains several directives (including GET, POST, etc.) that enable clients to operate on resources described in the uniform resource indicator (URI). However, except POST, all other directives (that is, GET, HEAD, PUT, DELETE, OPTIONS, and TRACE) are idempotent in behavior. At least one embodiment of the invention includes implementing the following heuristics for these resource modifiers to remove undesirable linkages.

For instance, repeat occurrences of idempotent actions for a specific URI can be disregarded. In other words, in one or more embodiments of the invention, a REST message corresponding to an idempotent request/response that has been seen in the transaction's past can be ignored because it does not result in any state update. Additionally, in accordance with one or more embodiments of the invention, there are several sequences of modifier directives that are unlikely to occur in a logical transaction. For example, it is unlikely for a transaction to create a resource and then immediately delete it (that is, a POST immediately followed by a DELETE for the same resource). However, in at least one embodiment of the invention, transaction stitching using the context subset inequality can introduce such unlikely transitions as linkages in the execution graph.

Further, multiple GET requests may interleave two modifier requests, such as PUT, POST or DELETE. It can be desirable that a subset of the contexts extracted from GET responses between the two modifiers be utilized in the second modifier request, assuming the absence of any irrelevant GET requests.

As also described herein, OpenStack® setups can install different services on separate nodes for scalability and fault isolation. In such a scenario, one or more embodiments of the invention can include leveraging this setup to improve precision. By way of example, placing certain components on a node with a distinct IP address can facilitate accurate determination of the starting point for each user-level transaction. Additionally, it is noted that OpenStack® services leverage REST calls for inter-component communication, while intra-component communication occurs using RPC messages. This observation facilitates prevention of the addition of transitions (that is, REST calls) across states for the same component.

Further, a service may be distributed across multiple nodes in the deployment, and control may migrate from one node to another node within the service via RPCs. Thus, before stitching a REST request to a possible parent state, at least one embodiment of the invention can include analyzing the RPCs at the parent state to identify a list of possible destination IPs to which control could have migrated. In such an embodiment, the REST request can be stitched to the possible parent only if the source IP of the request is either the IP of the parent or is part of the list of possible destination IPs.

Note that even if services share IP addresses, one or more embodiments of the invention can include only requiring the various OpenStack® HTTP clients to report the source service as an HTTP request header to prevent spurious linkages. No further changes would be needed in the core deployment.

Also, transactions in OpenStack® can see continuous activity, commonly in the form of status update requests. At least one embodiment of the invention includes leveraging this observation to distinguish between completed transactions and ongoing transactions. Specifically, if a particular transaction does not get updated with any new events over a predetermined period of time, an example embodiment of the invention can include deducing and/or determining that the transaction has been completed. Pruning such completed transactions from the execution graph helps prevent spurious linkages and reduces the maintained state space.

Accordingly, at least one embodiment of the invention includes periodic purging of completed transactions from data structures by pre-determining a threshold M of the number of messages processed by the analyzer service among which consecutive events in the transaction are to be observed. The construction of an execution graph can be augmented by maintaining an ordered list of "purge buckets" (also referred to herein as "p-buckets"). When messages are processed to update the execution graph, the created states are also added to the current active p-bucket. Once $\mu$ new messages have been processed, a new p-bucket is added to the list of p-buckets in order to receive new states. As used herein, "$\mu$" is determined empirically based on the system configuration.

This mechanism enables identification of transactions that have not seen recent activity. By way of example, let $B_{1\ldots n}$ be the list of all p-buckets, with $B_n$ being the latest (the current active) bucket, and $B_1$ being the oldest. Also, assume that all transactions that have not seen any new states in the last $\lceil M/\mu \rceil$ p-buckets are assumed to have been completed; that is, all transactions that lie completely in buckets $B_1 \ldots B_{n\text{-}M/\mu}$ are deemed complete. These transactions appear in the execution graph as disconnected components and can be purged. An alternate approach to state count-based p-buckets can be to implement a time-based purge mechanism, wherein transactions that do not have new events during a threshold and/or user-selected period of time are purged from the execution graph. The thresholds in both cases can be system-dependent and empirically determined.

Figure 3:
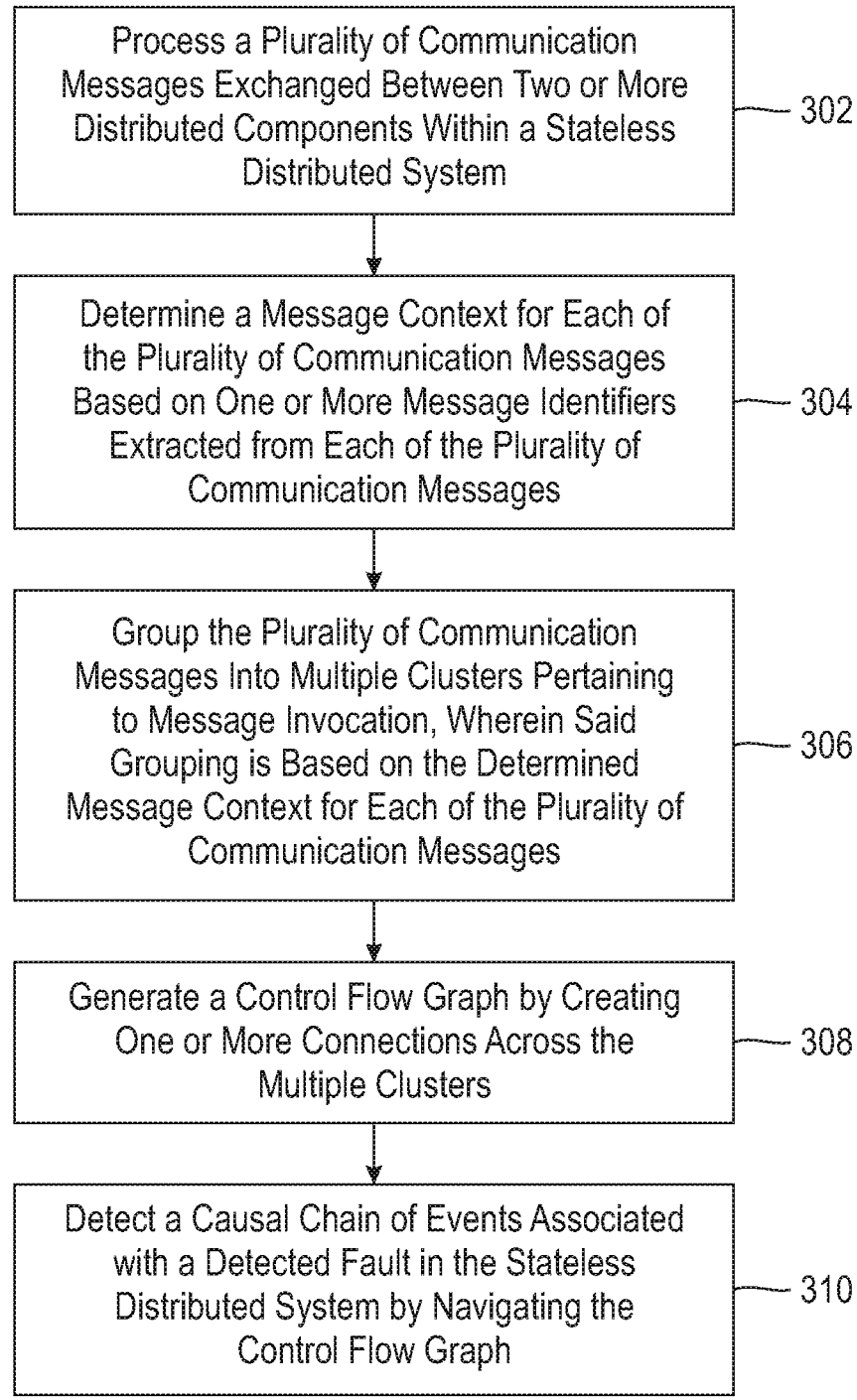
FIG. 3 is a flow diagram illustrating techniques according to an embodiment of the invention.

FIG. 3 is a flow diagram illustrating techniques according to an embodiment of the present invention. Step 302 includes processing a plurality of communication messages exchanged between two or more distributed components within a stateless distributed system. The plurality of communication messages can include one or more representational state transfer messages and/or one or more remote procedure call messages. Also, as detailed herein, processing can include implementing one or more monitoring agents on each component within the stateless distributed system.

Step 304 includes determining a message context for each of the plurality of communication messages based on one or more message identifiers extracted from each of the plurality of communication messages. Determining the message context for each of the plurality of communication messages can be further based on message latency associated with each of the plurality of communication messages. Additionally, determining the message context for each of the plurality of communication messages can be further based on one or more items of metadata associated with each of the plurality of communication messages. The one or more items of metadata can include (i) a source associated with each of the plurality of communication messages, (ii) a destination associated with each of the plurality of communication messages, (iii) a protocol associated with each of the plurality of communication messages, and/or (iv) the message body of each of the plurality of communication messages.

Additionally, the techniques depicted in FIG. 3 can also include transmitting the determined message context to an analyzer subsystem for causal ordering of the plurality of communication messages across the two or more components within the stateless distributed system. Further, one or more embodiments of the invention can include extracting the one or more message identifiers from each of the plurality of communication messages, wherein said extracting comprises using one or more regular expressions to prevent a need for explicit parsing of one or more protocol messages.

Step 306 includes grouping the plurality of communication messages into multiple clusters pertaining to message invocation, wherein said grouping is based on the determined message context for each of the plurality of communication messages. Step 308 includes generating a control flow graph by creating one or more connections across the multiple clusters. Creating one or more connections across the multiple clusters can include stitching together related message contexts into one or more logical transactions.

Step 310 includes detecting a causal chain of events associated with a detected fault in the stateless distributed system by navigating the control flow graph. Navigating the control flow graph can include backtracking from the detected fault in the graph to the start state for a given transaction to identify the causal chain of events.

The techniques depicted in FIG. 3 can also include implementing one or more time buckets to enforce a temporal ordering on the plurality of communication messages. Additionally, the techniques depicted in FIG. 3 can also include creating a temporal order of the plurality of communication messages. Additionally, the techniques depicted in FIG. 3 can also include pruning the control flow graph based on domain knowledge pertaining to message invocations as well as pruning the control flow graph based on one or more heuristics.

Also, an additional embodiment of the invention includes implementing a monitoring agent at each of multiple nodes in a stateless distributed system to monitor all communication messages exchanged between the multiple nodes, and determining a message context for each of the monitored communication messages based on one or more message identifiers extracted from each of the monitored communication messages. Such an embodiment can also include grouping the monitored communication messages into multiple clusters pertaining to message invocation, wherein such grouping is based on the determined message context for each of the monitored communication messages. Additionally, such an embodiment can include generating a control flow graph by (i) creating a temporal order of the monitored communication messages in each of the multiple clusters, and (ii) creating one or more connections across the multiple clusters, as well as detecting a causal chain of events associated with a detected fault in the stateless distributed system by navigating the control flow graph.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
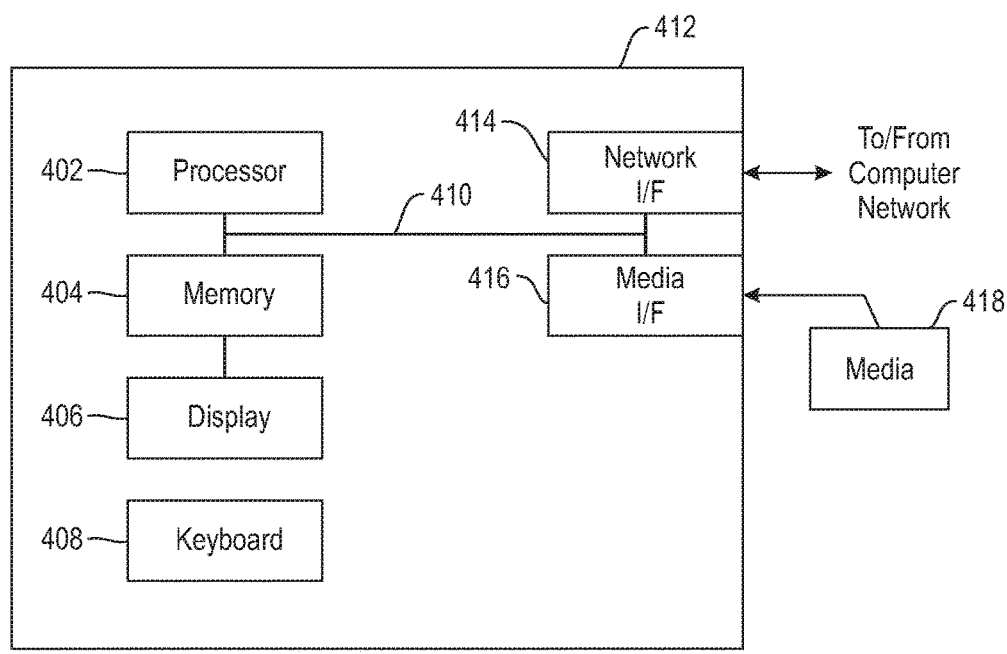
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining a message context based on message identifiers for determining clusters of related message invocations for creating causal linkages across message invocations to detect broad classes of faults reflected in network messages as errors and/or exceptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    processing a plurality of communication messages exchanged between two or more distributed components within a stateless distributed system, wherein the plurality of communication messages comprises (i) one or more representational state transfer messages and (ii) one or more remote procedure call messages;
    determining a message context for each of the plurality of communication messages based on one or more message identifiers extracted from each of the plurality of communication messages;
    grouping the plurality of communication messages into multiple clusters pertaining to message invocation, wherein said grouping is based on the determined message context for each of the plurality of communication messages;
    generating a control flow graph by creating one or more connections across the multiple clusters; and
    detecting a causal chain of events associated with a detected fault in the stateless distributed system by navigating the control flow graph;
    wherein the steps are carried out by at least one computing device.

2. The computer-implemented method of claim 1, comprising:
    transmitting the determined message context to an analyzer subsystem for causal ordering of the plurality of communication messages across the two or more components within the stateless distributed system.

3. The computer-implemented method of claim 1, comprising:
    implementing one or more time buckets to enforce a temporal ordering on the plurality of communication messages.

4. The computer-implemented method of claim 1, wherein said processing comprises implementing one or more monitoring agents on each component within the stateless distributed system.

5. The computer-implemented method of claim 1, wherein said determining the message context for each of the plurality of communication messages is further based on message latency associated with each of the plurality of communication messages.

6. The computer-implemented method of claim 1, comprising:
    extracting the one or more message identifiers from each of the plurality of communication messages, wherein said extracting comprises using one or more regular expressions to prevent a need for explicit parsing of one or more protocol messages.

7. The computer-implemented method of claim 1, wherein said determining the message context for each of the plurality of communication messages is further based on one or more items of metadata associated with each of the plurality of communication messages.

8. The computer-implemented method of claim 7, wherein the one or more items of metadata comprise (i) a source associated with each of the plurality of communication messages and/or (ii) a destination associated with each of the plurality of communication messages.

9. The computer-implemented method of claim 7, wherein the one or more items of metadata comprise a protocol associated with each of the plurality of communication messages.

10. The computer-implemented method of claim 7, wherein the one or more items of metadata comprise the message body of each of the plurality of communication messages.

11. The computer-implemented method of claim 1, comprising:
    creating a temporal order of the plurality of communication messages.

12. The computer-implemented method of claim 1, wherein said creating one or more connections across the multiple clusters comprises stitching together related message contexts into one or more logical transactions.

13. The computer-implemented method of claim 1, wherein said navigating the control flow graph comprises backtracking from the detected fault in the graph to the start state for a given transaction to identify the causal chain of events.

14. The computer-implemented method of claim 1, comprising:
    pruning the control flow graph based on (i) domain knowledge pertaining to message invocations and/or (ii) one or more heuristics.

15. A computer program product, the computer program product comprising a computer readable storage medium having program instructions embodied therewith, the program instructions executable by a device to cause the device to:
    process a plurality of communication messages exchanged between two or more distributed components within a stateless distributed system, wherein the plurality of communication messages comprises (i) one or more representational state transfer messages and (ii) one or more remote procedure call messages;
    determine a message context for each of the plurality of communication messages based on one or more message identifiers extracted from each of the plurality of communication messages;
    group the plurality of communication messages into multiple clusters pertaining to message invocation, wherein said grouping is based on the determined message context for each of the plurality of communication messages;
    generate a control flow graph by creating one or more connections across the multiple clusters; and
    detect a causal chain of events associated with a detected fault in the stateless distributed system by navigating the control flow graph.

16. A system comprising:
    a memory; and
    at least one processor coupled to the memory and configured for:
        processing a plurality of communication messages exchanged between two or more distributed components within a stateless distributed system, wherein the plurality of communication messages comprises (i) one or more representational state transfer messages and (ii) one or more remote procedure call messages;

determining a message context for each of the plurality of communication messages based on one or more message identifiers extracted from each of the plurality of communication messages;

grouping the plurality of communication messages into multiple clusters pertaining to message invocation, wherein said grouping is based on the determined message context for each of the plurality of communication messages;

generating a control flow graph by creating one or more connections across the multiple clusters; and detecting a causal chain of events associated with a detected fault in the stateless distributed system by navigating the control flow graph.

17. A computer-implemented method, comprising:

implementing a monitoring agent at each of multiple nodes in a stateless distributed system to monitor all communication messages exchanged between the multiple nodes, wherein the communication messages comprise (i) one or more representational state transfer messages and (ii) one or more remote procedure call messages;

determining a message context for each of the monitored communication messages based on one or more message identifiers extracted from each of the monitored communication messages;

grouping the monitored communication messages into multiple clusters pertaining to message invocation, wherein said grouping is based on the determined message context for each of the monitored communication messages;

generating a control flow graph by (i) creating a temporal order of the monitored communication messages in each of the multiple clusters, and (ii) creating one or more connections across the multiple clusters; and detecting a causal chain of events associated with a detected fault in the stateless distributed system by navigating the control flow graph;

wherein the steps are carried out by at least one computing device.

* * * * *